Figure 1:
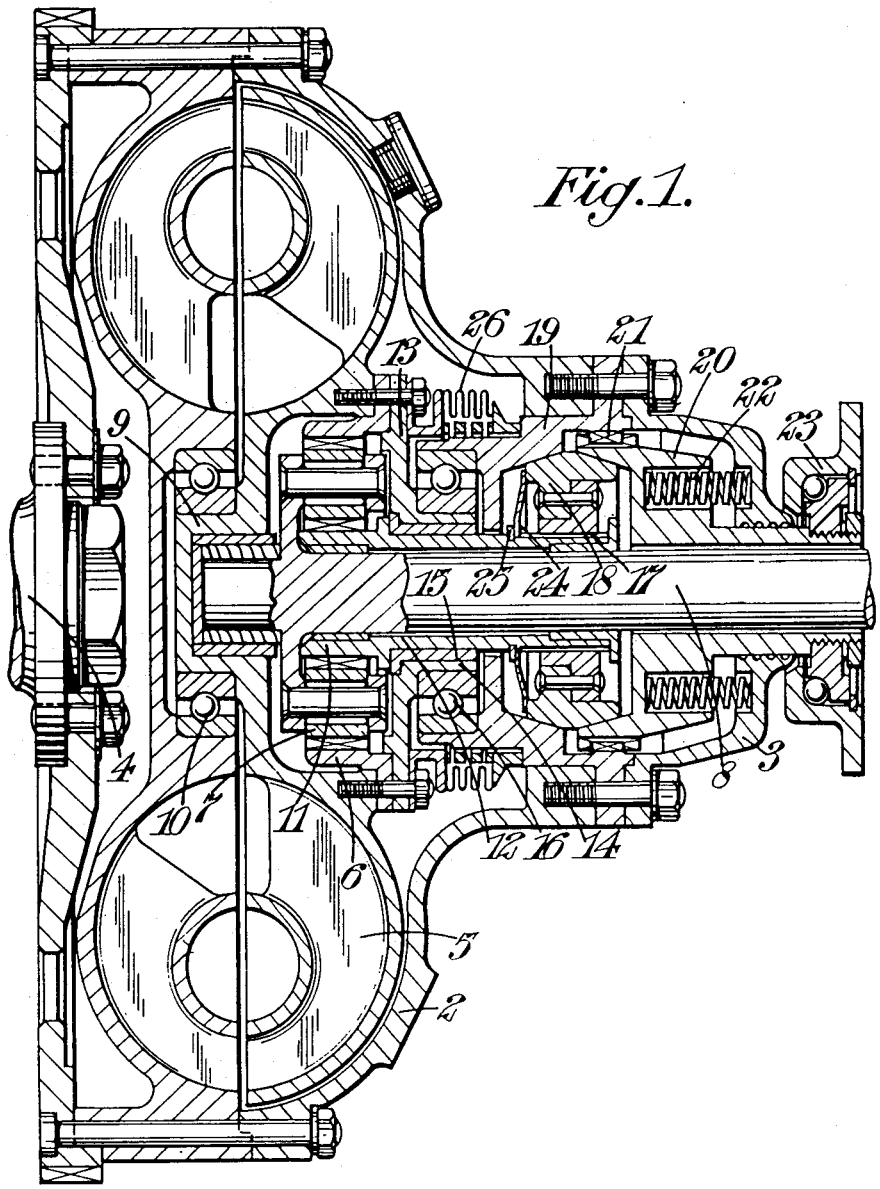

March 6, 1934.  G. T. SMITH-CLARKE  1,949,816

VARIABLE SPEED TRANSMISSION GEARING

Filed Nov. 15, 1932  2 Sheets-Sheet 1

Inventor:
George Thomas Smith-Clarke
By Mawhinney & Mawhinney
Attys.

March 6, 1934. G. T. SMITH-CLARKE 1,949,816
VARIABLE SPEED TRANSMISSION GEARING
Filed Nov. 15, 1932  2 Sheets-Sheet 2
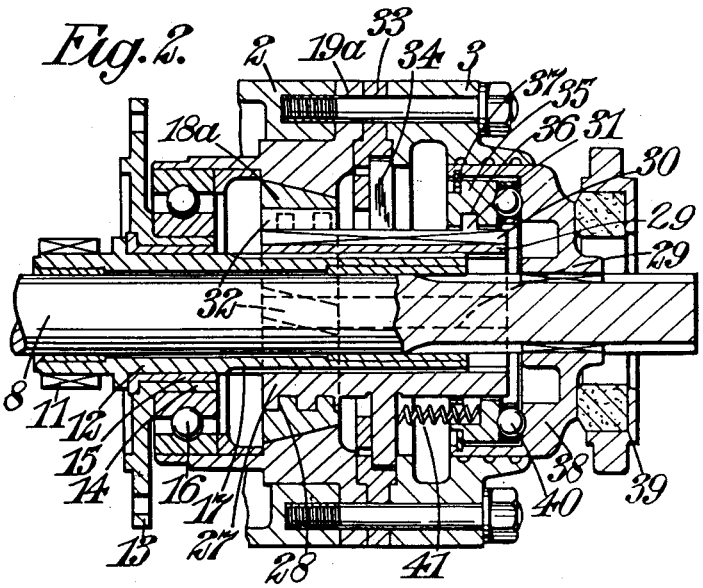
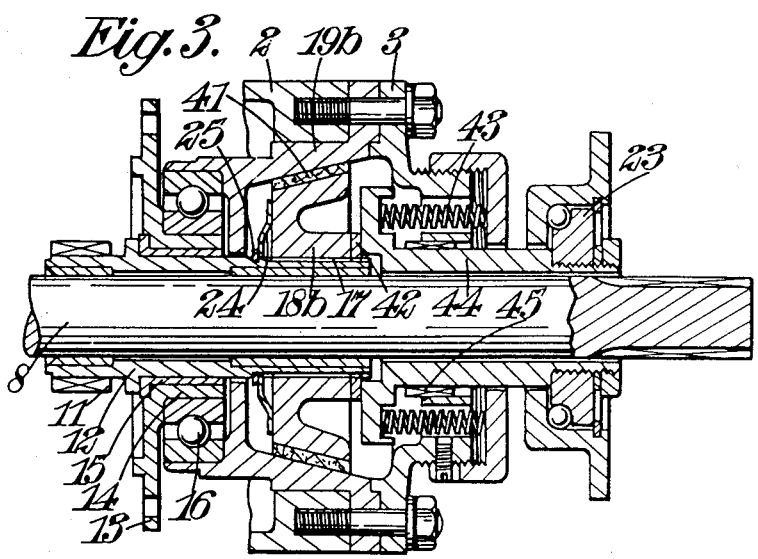
Inventor:
George Thomas Smith-Clarke
By Mawhinney & Mawhinney
Attys.

Patented Mar. 6, 1934

1,949,816

UNITED STATES PATENT OFFICE 1,949,816

VARIABLE-SPEED TRANSMISSION GEARING

George Thomas Smith-Clarke, Coventry, England, assignor of one-half to The Alvis Car & Engineering Company Limited, Coventry, England Application November 15, 1932, Serial No. 642,794
In Great Britain December 22, 1931

10 Claims. (Cl. 74—34)

This invention relates to transmission gearing, particularly for use on motor-vehicles, of the kind where the driving member of the gearing is connected to the sun gear of a planetary train as well as to the driving member of a two-element fluid coupling, whilst the two other elements of the planetary train are connected, respectively, to the driven member of the coupling and the driven member of the gearing. By this means the element of the planetary train to which the driven member of the fluid coupling is connected is rotated at a variable speed, which consequently modifies the action of the remainder of the planetary train so that the driven member of the transmission gearing will be rotated at a speed which varies inversely as the slip of the fluid coupling.

The two-element fluid coupling may be of the well-known Föttinger type, in which the driving member is a casing with internal vanes or cups which act through the medium of a fluid within the casing to drive a similarly-vaned or cupped member therein.

The planetary train may be of the epicyclic kind disposed within the annular casing of the fluid coupling, although it may be arranged externally thereof and can be other than epicyclic.

The main object of the present invention is to provide a very practical construction of this kind which will be particularly adapted for use with a supplementary change-speed mechanism, the different ratios of which can be introduced through sliding pinions or other positive engaging means.

According to the invention, provision is made for disconnecting the driving member of the transmission gearing from the sun gear of the planetary train.

The driving member of the transmission gearing may be connected with the sun gear through an automatically-locking mechanical clutch. The mechanical clutch is preferably one in which the driven member of the clutch is of light weight and, when freed, is not engaged by any friction means, such as a clutch operating fork. Furthermore, the driven member is preferably held quite clear of the co-acting driving member. It is conveniently a cone member, and provision may be made for biasing it out, as by means of a Belleville type of spring. In any case the mechanical clutch and fluid coupling are arranged in "parallel", and consequently no shock is imparted to the transmission should the engagement of the mechanical clutch be harsh or fierce, such shock being absorbed in the fluid coupling.

In the accompanying drawings:—

Figure 1 is a longitudinal section of such a transmission gearing adapted according to the invention; and Figures 2 and 3 are similar fragmentary views showing alternative forms of mechanical clutch, only the driven shaft of the transmission gearing and the sun gear being shown.

Like numerals indicate like parts throughout the drawings.

In one construction, as illustrated in Figure 1, suitable for use on a motor-vehicle, the fluid coupling is of the Föttinger type; and the planetary train (of the epicyclic kind) and the mechanical clutch are disposed within the casing 2 and an end plate 3 thereof forming the driving member of the coupling, being connected to the driving shaft 4 of the transmission gearing. The interior of the casing, adjacent its connection to the driving shaft 4, is provided with cups or vanes which drive through the medium of a fluid a similarly-adapted member 5 supported within the casing, this member being the driven coupling member. Attached to the latter is an internally-toothed ring 6 forming one element of the planetary train, and meshing with this is a number of planet pinions 7 carried by a shaft 8 which forms the driven shaft of the transmission gearing. The inner end of this shaft is spigoted into a recessed hub 9 on the driven coupling member, this hub being in turn supported externally through a ball bearing 10 in a recess in the driving member of the coupling.

The planet pinions mesh with a sun gear 11 on the end of a sleeve 12 surrounding the driven shaft, and the whole of the planetary train is housed within a recess in the driven coupling member and is finally enclosed by a plate 13 attached to the latter member across the mouth of the recess. This plate has a hub portion 14 surrounding the sun-gear sleeve 12, which it engages through a bearing 15, and externally journalled in a ball-bearing 16.

Beyond this bearing the sleeve is splined at 17 to carry the driven member 18 of a mechanical clutch. This member has opposed conical surfaces one of which co-acts with a similar surface on a driving plate 19 attached to the driving coupling member 2, 3 and housing at its other end the ball bearing 16. The other coned surface of the driven member 18 co-acts with a surface on a sleeve 20 which is splined at 21 to the driving coupling member and spring-pressed at 22 to move axially along the driven shaft 8, on which it is freely mounted, to effect engagement of the clutch, when the driving coupling member will be locked to the sun gear. The springs 22 abut the inturned flange of the end plate 3, which makes an oil-tight joint with the sleeve 20. Outside the joint the latter terminates with a withdrawal collar means 23, for effecting the disconnection of the sun gear from the driving coupling member. When the sleeve 20 is withdrawn, the driven clutch member 18 is freed from the co-acting driving plate by the spring washer 24, this being held on the shaft by the circlip 25. This washer is preferably of the Belleville type, i. e., a saucer-shaped spring washer that applies a material thrust over a relatively small distance—as the driven member of the clutch need only be moved a few thousandths of an inch to be entirely free from the driving member. The annular bellows 26 serves to isolate the fluid-containing portion of the coupling from the planetary train and the mechanical clutch.

It is exceedingly important that the driven member of the mechanical clutch should be entirely free of the driving member when the clutch is withdrawn; as then the sun-gear sleeve 12, and consequently the driven member of the mechanical clutch, must rotate at a speed which is a multiple of that of the driving member 2 to which the driving member of the mechanical clutch is directly connected, and in the opposite direction.

In the modification of Figure 2 the sun-gear sleeve 12 carries on its splines 17 a second short sleeve 27 which is mounted rotatably fast thereon. The inner end of the sleeve is formed externally with a quick-acting screw thread 28 and the whole of its length is formed with external longitudinal grooves 29, 29. Mounted in each of these is a key 30 which is substantially the length of the groove. The outer end of each key has a radial projection 31 whilst each inner end has an upstanding tooth 32 the sides of which are inclined to the axis of the sleeve. These inclined teeth engage co-operating inclined grooves in the bore of the driven clutch member (here marked 18a) which is also adapted to screw on to the quick-thread 28 formed on the short sleeve. This clutch member has a tapering peripheral surface which co-operates with a similar internal surface formed on the driving plate 19a. An annulus 33 attached to the driving plate engages the flange 34 on the sleeve 27 and thus locates it against endwise movement. At the outer end of the sleeve 27 is a collar 35 provided internally with a groove 36 engaged by the radial projections 31 on the keys.

The collar is held by the circlip 37 in the bore of a cup-shaped casing 38 slidably mounted in the end plate 3, and is moved endwise in one direction by a pedal or other control member through a thrust block 39 engaging the casing 38 and a thrust ring 40 between the latter and the collar. Compression engaging springs 41 act between the flange 34 and the collar 35, thus biasing the keys in engaging direction.

If it is desired to disconnect the driving casing of the fluid coupling and the sun-gear sleeve (for example, when it is required to change the gear ratios of a supplementary gear employing positive engaging means), the pedal or other control is actuated to thrust the keys 30 in the short sleeve 27 axially to effect rotation of the driven clutch member 18a by means of the inclined teeth on the keys. The clutch member moves axially simultaneously out of engagement through the agency of the co-operating quick screw thread. On release of the control the springs return the keys to their normal position and the driven clutch member to its engaging position. This engagement is such that the pressure between the co-acting clutch surfaces progressively increases to an extent that the clutch automatically becomes locked.

In the arrangement illustrated in Figure 3, the driven member (here marked 18b) of the mechanical clutch is formed with a frustum-shaped surface carrying a usual friction material 41, the combined angle of the frustum being somewhat about twenty-eight degrees in order to give a good self-locking effect although of small dimensions. To facilitate the freeing of the driven member from the driving member 19b when the clutch is disengaged, use is preferably made of a Belleville type spring washer 24, as described above. The driven member is moved in the engaging direction by means of a thrust ring 42 on the sun-gear sleeve 12, on which the driven member is splined, the thrust ring being spring pressed (by springs 43 stronger, of course, than the spring washer 24) by a sleeve 44 splined at 45 to the end plate 3 of the driving casing of the fluid coupling and journalled upon the driven shaft 8 of the gearing, being provided at its outer end with a withdrawal means 23.

By means of the invention a friction clutch, which is almost positive in action, is obtained, and one of small spinning mass which can be entirely freed from any part that is not rotating with it when the clutch is disengaged. Being in parallel with the fluid coupling it does not have to slip to avoid introducing shock into the drive, such shock being absorbed by the fluid coupling.

By using a mechanical clutch of the automatically locking type the clutch members can be made small while at the same time being capable of transmitting considerable torque.

What I claim as my invention and desire to secure by Letters Patent of the United States is:—

1. Transmission gearing including a two-element fluid coupling, a planetary train having a single sun gear, planetary pinions and an internally-toothed annulus, and means including a small cone clutch for selectively connecting and disconnecting the driving member of said coupling and said sun gear, the driven member of said coupling being directly connected to said annulus while said planetary pinions are directly connected to the driven member of the gearing.

2. Transmission gearing having driving and driven members and including a two-element fluid coupling, a three-element planetary train having a single sun gear, and a small cone clutch, the driving member of the gearing being connected directly to the driving member of said fluid coupling and to said sun gear through said clutch, whilst the two other elements of said planetary train are connected, respectively, to the driven member of said coupling and said driven member of the gearing.

3. Transmission gearing, according to claim 2, where the driven member of said cone clutch is small and of light weight, and disengaging means for said driven member whereby the latter when disengaged, is entirely freed from contact with any part that is not rotating with it.

4. Transmission gearing, according to claim 2 and further having yieldable engaging means for said cone clutch to provide a clutch which is a self-locking one.

5. Transmission gearing according to claim 2, where the driven member of said cone clutch is of frustum shape, the combined angle being somewhere about twenty-eight degrees.

6. Transmission gearing, according to claim 2, where the driven member of said cone clutch has opposed frustum surfaces co-operating with similar surfaces on the driving member.

7. Transmission gearing, according to claim 2, where the driven member of said cone clutch is biased to disengaging position by a dish-shaped spring washer.

8. Transmission gearing, according to claim 2, where said planetary train and said cone clutch are arranged within the casing of said coupling.

9. Transmission gearing including a two-element fluid coupling having a driving casing, a planetary train having a sun gear, an internally-toothed annulus, and planetary pinions carried by the driven shaft of the gearing and interconnecting said sun gear and annulus, said annulus being directly connected to the driven member of said coupling, said sun gear being carried by a sleeve free on said driven shaft, keying means on said sleeve, a slidable clutch member on said keying means, said clutch member co-acting with a driving face of said driving casing, a spring-pressed presser plate, keyed to said driving casing, for forcing said clutch member into engagement with said co-acting face, and spring means for disconnecting said clutch member from said co-acting face when said presser plate is withdrawn.

10. Transmission gearing comprising a two-element fluid coupling, a driven shaft, a planetary train including a sun gear freely mounted on the driven shaft, an internally toothed annulus directly connected to the driven member of the coupling and planetary pinions carried by the driven shaft and interconnecting said sun gear and annulus, a slidable clutch member keyed to said sun gear and coacting with a driving face of the driving member of the coupling, and shifting means for moving said clutch member into and out of engagement with the driving face of the driving member of the coupling.

GEORGE THOMAS SMITH-CLARKE.